United States Patent [19]

Wolf et al.

[11] Patent Number: 5,002,702
[45] Date of Patent: Mar. 26, 1991

[54] STABILIZER COMPOSITIONS COMPRISING A THIOPHOSPHATE AND AN ORGANO TIN COMPOUND

[75] Inventors: Rainer Wolf, Allschwil; Jean-Paul Kehrli, Arlesheim, both of Switzerland

[73] Assignee: Sandoz Ltd., Basel, Switzerland

[21] Appl. No.: 217,018

[22] Filed: Jul. 8, 1988

[30] Foreign Application Priority Data

Jul. 10, 1987 [GB] United Kingdom ................. 8716322
Apr. 21, 1988 [GB] United Kingdom ................. 8809472

[51] Int. Cl.$^5$ .............................................. C09K 21/12
[52] U.S. Cl. .................................................. 252/609
[58] Field of Search ............... 252/400.22, 400.51, 252/389.22, 609

[56] References Cited

U.S. PATENT DOCUMENTS

| | | | |
|---|---|---|---|
| 3,502,616 | 3/1970 | Stapfer et al. | 252/180 |
| 4,051,029 | 9/1977 | Redmore et al. | 252/180 |
| 4,147,636 | 4/1979 | Drake et al. | 252/8.1 |
| 4,148,747 | 4/1979 | Lyons | 252/400 |
| 4,220,472 | 9/1980 | Mauric et al. | 106/18.18 |
| 4,418,169 | 11/1983 | Gibbons, Jr. et al. | 524/178 |

FOREIGN PATENT DOCUMENTS

| | | | |
|---|---|---|---|
| 1156448 | 11/1983 | Canada | 252/400.51 |
| 1173230 | 8/1984 | Canada | 252/400.51 |
| 60-197753 | 3/1984 | Japan | 252/400.51 |

*Primary Examiner*—John S. Maples
*Assistant Examiner*—Joseph D. Anthony
*Attorney, Agent, or Firm*—Gerald D. Sharkin; Richard E. Vila; Thomas C. Doyle

[57] ABSTRACT

A composition, for stabilizing a polymeric material, (hereinafter defined as a stabilizing composition) comprising
(a) a thiophosphate compound; and
(b) an organo tin compound.

14 Claims, No Drawings

STABILIZER COMPOSITIONS COMPRISING A THIOPHOSPHATE AND AN ORGANO TIN COMPOUND

The invention relates to novel compositions for stabilising polymeric material, e.g. during processing.

According to the invention, there is provided a composition for stabilising a polymeric material (hereinafter referred to as a stabilising composition) comprising
(a) a thiophosphate compound; and
(b) an organo-tin compound.

For the avoidance of doubt the term thiophosphate includes thiopyrophosphate.

Preferably component (a) is a thiopyrophosphate.

More preferably component (a) is a compound of formula I or II

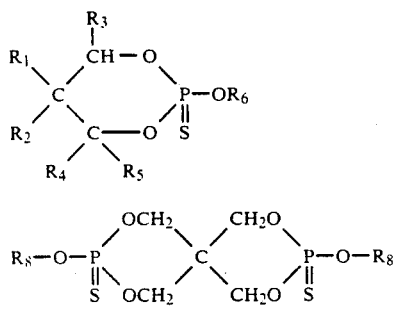

in which $R_1$ is hydrogen; $C_{1-4}$alkyl; —$CH_2Br$; —$CH_2Cl$; phenyl; —CO—$OC_{1-6}$alkyl or —$CH_2$—O—$C_{1-4}$alkyl;

$R_2$ is hydrogen; $C_{1-4}$alkyl; —$CH_2Br$; —$CH_2$—Cl; —CO—$OC_{1-6}$alkyl; or $R_1$ and $R_2$ together with the carbon atom to which they are attached form a cyclohexyl or cyclohexenyl group;

$R_3$ and $R_4$ independently are hydrogen or $C_{1-4}$alkyl;

$R_5$ is —$CH_3$ or —H and $R_6$ is $C_{1-8}$alkyl; $C_{5-7}$cycloalkyl (preferably cyclohexyl); phenyl unsubstituted or substituted by 1 to 3 substituents selected from $C_{1-4}$alkyl, $C_{1-4}$alkoxy and halogen or a group of formula (a)

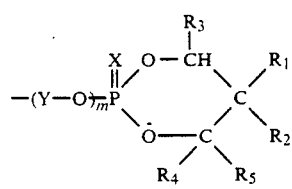

in which
X is O or S;
m is 0 or 1;
Y is $C_{5-6}$cycloalkylene, uninterrupted or interrupted by one or two atoms selected from O and N (preferably cyclohexylene), unsubstituted or substituted by one or two groups selected from $C_{1-4}$alkyl, $C_{1-4}$alkoxy and halogen; $C_{1-18}$alkylene, uninterrupted or interrupted by one or two atoms selected from N and O and unsubstituted or mono- or di-substituted by halogen; phenylene unsubstituted or substituted by one or two groups selected from $C_{1-4}$alkyl, $C_{1-4}$alkoxy and halogen; $C_{2-4}$alkenylene formula (i)

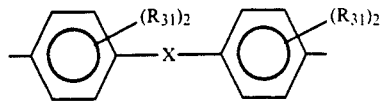

where
$R_{31}$ is hydrogen,
Cl, Br or $CH_3$ and X is —C($CH_3$)$_2$—; —$CH_2$—; —S—; —SO—; —$SO_2$—, —NH— or —O—; or a group of formula ii

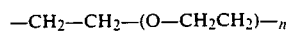

where
n = 1 to 10; and
$R_8$ is $C_{1-18}$alkyl, $C_{5-7}$cycloalkyl (preferably cyclohexyl) or phenyl unsubstituted or substituted by one or two groups selected from halogen, $C_{1-4}$alkyl and $C_{1-4}$alkoxy (preferably unsubstituted phenyl).

Preferably a stabilising composition according to the invention additionally contains (c) a phenolic antioxidant. Such antioxidants include benzofuran-2-ones; indolin-2-ones beta-(4-hydroxy-3,5-ditert.-butylphenyl)-propionyl-stearate, methanetetrakis-[methylene-3(3',5'-ditert.-butyl-4-hydroxyphenyl-)-propionate], 1,3,3-tris-(2-methyl-4-hydroxy-5-tert.-butylphenyl)-butane, 1,3,5-tris(4-tert.-butyl-3-hydroxy-2,6-dimethyl-benzyl)-1,3,5-triazin-2,4,6 (1H, 3H, 5H-trione, bis-(4-tert.-butyl-3-hydroxy-2,6-dimethylbenzyl)-dithiolterephthalate, tris-(3,5-ditert.-butyl-4-hydroxybenzyl)isocyanurate, the triester of beta-(4-hydroxy-3,5-ditert.-butylphenyl) propionic acid with 1,3,4-tris-(2-hydroxy-ethyl)-5-triazin-2,4,6 (1H, 3H, 5H)trione, bis-]3,4-bis(4'-hydroxy-3-tert.-butylphenyl)-butyric acid] glycol ester, and 2,2'-methylene-bis-(4-methyl-6-tert.-butylphenol) and the compound of the formula

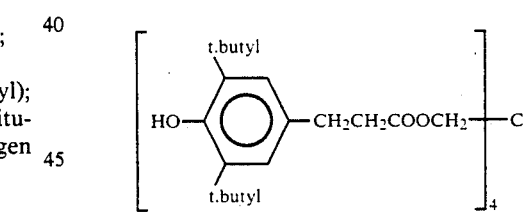

Preferably a stabilising composition according to the invention contains one or more metallic carboxylates (such as calcium stearate).

More preferred compounds of component (a) are those of formula I where $R_6$ is a group of formula (a) where m=0.

Most preferred compounds of component (a) are of the formula Ia

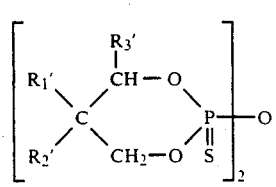

in which
$R_1'$ is $C_{1-4}$alkyl or phenyl;
$R_2'$ is $C_{1-4}$alkyl; and $R_3'$ is hydrogen or $C_{1-4}$alkyl.

Preferably component (b) is selected from tin carboxylates (e.g. di($C_{1-12}$alkyl) tin carboxylates) and tin mercaptides (e.g. di($C_{1-12}$alkyl) tin mercaptides).

More preferably component (b) is a compound of formula III

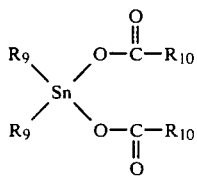   (III)

in which $R_9$ is $C_{1-12}$alkyl; and $R_{10}$ is $C_{1-12}$alkyl, —CH=CH—CO—O$C_{1-6}$alkyl, or both groups $R_{10}$ form a bridging group —CH=CH—;

a compound of formula IV or V

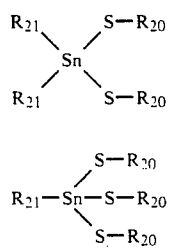

in which $R_{21}$ is selected from $C_{1-12}$alkyl (particularly —CH$_3$, n$C_8H_{17}$ and n$C_{12}H_{25}$) or —CH$_2$—CH$_2$—CO—O—$C_{1-12}$alkyl; and $R_{20}$ independently, is —CH$_2$—CO—$C_{1-12}$alkyl, —CH$_2$CH$_2$—CO—O$C_{1-12}$alkyl, —CH$_2$CH$_2$—O—CO—$C_{1-12}$alkyl or $C_{1-12}$alkyl;

a compound of formula VI

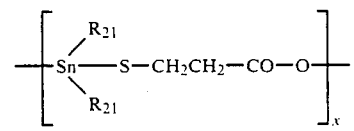   (VI)

where $R_{21}$ is as defined above and x is an integer from 1 to 20 inclusive;

a compound of formula VII

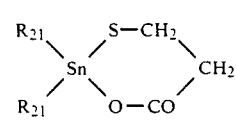   (VII)

where $R_{21}$ is as defined above;

the compound of formula VIII

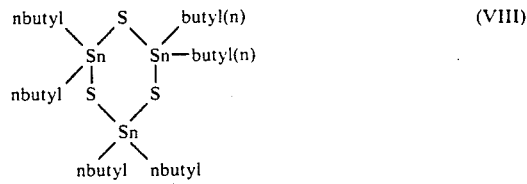   (VIII)

or the compound of formula IX

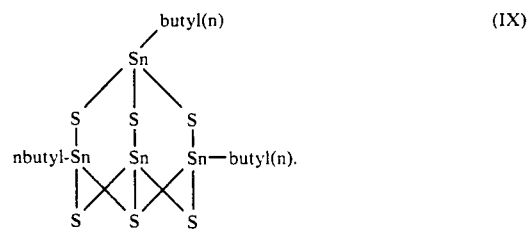   (IX)

Most preferably component (b) is a compound of formula III.

Preferred stabilising compositions according to the invention comprise (a) the compound of formula X

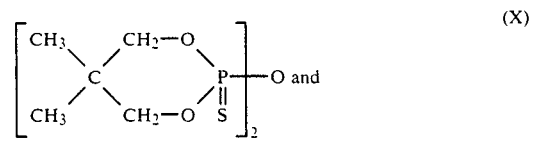   (X)

(b) di-$C_{4-8}$alkyl tin maleate.

Preferably in stabilising compositions according to the invention, the ratio of component (a) to (b) is 10:1 to 1:10, more preferably 3:1 to 1:3, most preferably 2.5:1.

Further, according to the invention, there is provided a polymeric composition (hereinafter referred to as a polymeric composition) comprising a polymeric material and a stabilising amount of a stabilising composition according to the invention.

Preferably, the stabilizing composition of the invention is present in the polymeric material in an amount sufficient to stabilize the polymeric material against degradation during processing, e.g. molding or extruding.

More preferably the combined amount of components (a) and (b) present in such a polymeric composition is from 0.01 to 1%; more preferably 0.05 to 0.6% by weight based on the polymeric material.

Preferred polymeric materials to be stabilised are polyolefins such as polypropylene, polyethylene (e.g. high density polyethylene, low density polyethylene, linear low density polyethylene or medium density polyethylene), polyisobutylene, poly-4-methylpentene and copolymers thereof (such as EVA-ethylene vinyl acetate).

Further polymeric materials that can be stabilised by a stabilising composition according to the invention include polystyrene and copolymers and blends thereof, ABS, polyvinyl acetate, polyvinylalcohol, polyacetate (POM), polyacrylate and polymethacrylate, polyacrylonitrile, polyacrylamide, PVC, polyvinylidene chloride, polyamide, polyester for example polybutylene terephthalate and polyethyleneterephthalate, polyether (e.g. PPO), polythioether and thioplast, polycarbonate, polyurethane, cellulose derivatives, maleinate resins, melamine resins, phenolic resins, aniline resins, furan resins, carbamide resins, epoxide resins and silicon resins.

Further, according to the invention there is provided a masterbatch comprising 10 to 90% by weight of a stabilising composition and 90 to 10% by weight of a polymeric material.

Further, according to the invention there is provided a flame-proofing composition comprising a stabilising composition (as herein defined) according to the invention or a polymeric composition (as herein defined) according to the invention and a flameproofing amount of a flameproofing agent, preferably that of formula 2a in Example 2 below.

Further additives that can be added to a stabilising or a polymeric composition according to the invention include U.V. stabilisers such as hindered light amine stabilisers and U.V. absorbers, antistatic agents, softeners, nucleating agents, metal deactivators, biocides, impact modifiers, fillers, pigments and fungicides.

Examples of such additives include sterically hindered phenols, sulphur or phosphorus-containing compounds or mixtures of these. Examples are sulphur-containing antioxidative co-stabilizers which may be used include for example distearylthiodipropionate, dilaurylthiodi-propionate, methane tetrakis-(methylene-3-hexylthiopropionate) and dioctadecyl-disulphide. Phosphorus-containing co-stabilizers include for example trinonylphenyl-phosphite, 4,9-distearyl-3,5,8,10-tetraoxadiphosphaspiroundecane, tris-(2,4-ditert.-butylphenyl)-phosphite and tetrakis (2,3-ditert.-butylphenyl)-4,4′-biphenylene diphosphonite. Further additives such as aminoaryl compounds, U.V. absorbers and light stabilizers e.g. 2-(2′-hydroxyphenyl)-benzo-triazole, 2-hydroxybenzophenone, 1,3-bis-(2′-hydroxybenzoyl)-benzene, salicylates, cinnamates, benzoates and substituted benzoates, sterically hindered amines (for example N-unsubstituted, N-alkyl or N-acyl substituted 2,2,6,6-tetra-methylpiperidine compounds) and oxalic acid diamides may be used. Other known types of additives, e.g. flame retardants and antistatic agents, may also be added.

Preferred flame retardants are halogenated organic compounds are those selected from tetrabromophthalic acid anhydride; tetrabromo phthalic acid imide; bicyclo[2,2,1]heptan-2,3-dicarboxylic acid derivatives, such as the compound of the formula

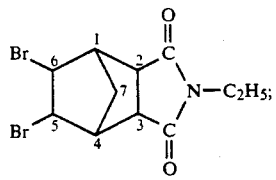

terephthalic acid esters, such as bis-[2,3-dibromopropyl]-terephthalate; halogenated carbonates, such as 2,2-bis-bromoethyl-3-bromopropyl carbonate or tribromophenyl carbonate; halogenated diphenyls or diphenyleneoxides, such as decabromodiphenylene oxide; octabromodiphenylene oxide; brominated polymeric compounds, such as poly(tribromostyrene) and brominated polyphenylene ether; halogenated benzene, toluene, xylene or ethylbenzene, such as hexabromobenzene, pentabromotoluene, tetrabromoxylene, and pentabromoethylbenzene; halogenated cycloaliphatic compounds, such as hexabromocyclodecane, methyl-dibromocyclohexane, perchloropentacyclodecane or chlorinated paraffin with a chlorine content of 20 to 75% and halogenated bisphenols optionally diethoxylated, such as halogenated alkylaryl ethers, as for example 2,2-bis-(2′,3′-dibromo-propoxy)-3,5-dibromophenyl)propane and 1,2-bis(tribromophenyloxy)-ethylene.

Of the especially preferred halogenated organic compounds the 20 to 75% chlorinated paraffins, the brominated cycloaliphatic compounds such as hexabromocyclododecane; and brominated diphenyls and diphenyleneoxides such as octa-or decabromodiphenylene oxide and 1,2-bis(tribromophenyleneoxy)ethylene are most preferred.

Preferred diphenyl and diphenylethers are those of the formula

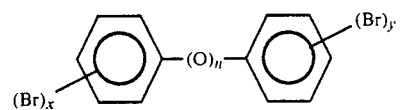

where
n is 0 or 1
x and y independently are integers from 2 to 5 inclusive.

Stabilising compositions according to the invention may be added to the polymeric material before, during or after the polymerization step and may be added in solid form, in solution preferably as a liquid concentrate containing from 20 to 80% by weight of the composition and 80 to 20% by weight of solvent or as a solid masterbatch composition containing 20 to 80% (more preferably 40 to 70%) by weight of the composition and 80 to 20% (more preferably 60 to 30%) by weight of a solid polymeric material which is identical with or compatible with the material to be stabilized.

The compositions according to the invention may be incorporated by known methods into the polymeric material to be stabilized. Of particular importance is blending of the compounds with thermoplastic polymers in the melt, for example in a melt blender or during the formation of shaped articles, including foils, tubes, fibres and foams by extrusion, injection moulding, blow moulding, spinning or wire coating. The compositions according to the invention are particularly useful for polypropylene fibres or foils.

For the avoidance of doubt in this Specification except in the Examples, reference to a compound of a particular formula in this Specification includes mixtures. Further, in this Specification, where a range is given, the figures defining the range are included therein. Any group capable of being linear or branched is linear or branched unless indicated to the contrary. Where a symbol appears more than once in a formula, its significances are independent of one another unless indicated to the contrary.

The invention will now be illustrated by the following Examples in which all parts and percentages are by weight and all temperatures are in °C.

EXAMPLE 1

2.5 Parts of the compound of formula 1a

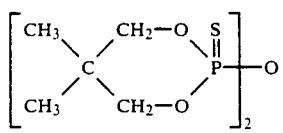

1 part of dibutyl tin maleate

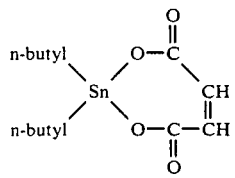

and 5 parts of calcium stearate are added to 5000 parts of a commercially available polypropylene [MFI 230° C./2.16 Kp)4-5].

To this mixture, 2.5 parts of the compound of formula 1b

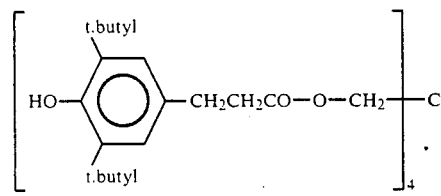

dissolved in 100 parts of acetone are added.

This mixture is mixed together in a fast mixer (Chimica) and then is dried in an open air oven for 60 minutes at 50° C.

The mixture is extruded through an extrusiometer (Göttfert) having a temperature gradient of 150°–250° C. and at an extrusion of 1.2 kg/hour, after which it is granulated. The melt flow index MFI (230° C./2.16 kp) and the yellowness index are then measured. The polymer is then re-extruded a further nine times and the resulting MFI and yellowness values are measured after the first, fifth and tenth extrusions.

COMPARATIVE EXAMPLE A 5 parts of calcium stearate are added to 5000 parts of the same commercially available polypropylene as in Example 1.

2.5 Parts of tetrakis-(2,4-di-tert.-butylphenyl)-4,4'-biphenylene phosphonite and 2.5 parts of the compound of formula 1b (defined in Example 1) dissolved in 200 parts of acetone are added to this mixture.

The mixture is then extruded in the same Extrusiometer as in Example 1 having a temperature gradient of 150°–250° C. and an extrusion rate of 1.2 kg/hour, after which it is granulated. The MFI and Yellowness Index are then determined from the resulting granulate and, as in Example 1 the polymer is extruded again 9 more times and the MFI and Yellowness Index are measured after the first, fifth and tenth extrusion.

The results are given in the Table below.

TABLE

| Extrusion No. | MFI | | | Yellowness Index | | |
|---|---|---|---|---|---|---|
| | 1 | 5 | 10 | 1 | 5 | 10 |
| Example 1 | 3.9 | 5.3 | 7.7 | 0.0 | 2.5 | 5.0 |
| Comparative Example | 3.7 | 5.7 | 9.7 | 2.6 | 10.3 | 12.6 |

EXAMPLE 2

43.28 Parts of the compound of the formula 2a

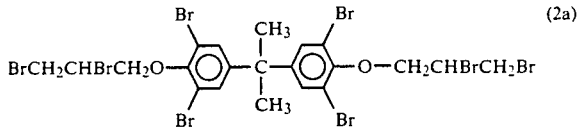

4.36 parts of dibutyl tin maleate; and 2.00 parts of the compound of formula 1a defined in Example 1 are mixed into 50.36 parts of a commercially available polypropylene [MFI (230° C./2.16 kp) 7-15]. This mixture is homogenised extruded on a continuous extruder and worked up into a master batch.

95 Parts of the same commercially available polypropylene are mixed with 5 parts of the above master batch in a rolling cylinder. The mixture is then extruded through an extrusiometer (Göttfert) by a method analogous to that of Example 1. The MFI is then measured by a method analogous to that of Example 1, except that the polymer is only re-extruded once.

COMPARATIVE EXAMPLE B 43.28 Parts of the compound of formula 2a defined in Example 2, 4.36 parts of dibutyltin maleate and 7.64 parts of the compound of the formula

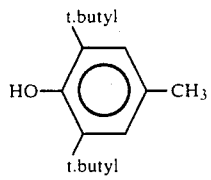

are mixed with 44.72 parts of the same commercially available polypropylene as in Example 2. This is then added, as a masterbatch, to polypropylene by a method analogous to that of Example 1, and then extruded according to Example 1, except that the polymer is only re-extruded once. The MFI for each extrusion is given in Table 2 below.

TABLE 2

| Extrusion | MFI | |
|---|---|---|
| | 1 | 2 |
| Example 2 | 13.10 | 14.30 |
| Comparative Example B | 17.30 | 23.10 |

EXAMPLE 3

0.05 Parts of the compound of formula 1a (defined in Example 1), 0.02 parts of the compound of formula 1b (defined in Example 1) and 0.02 parts of dibutyltin maleate are mixed in 100 parts of a commercially available high density polyethylene (Marlex TR 130 from Phillips) and then extruded through an extrusiometer at 240° C. by a method analogous to that of Example 1. The MFI is then tested after multiple extrusions at 240° C.

EXAMPLES 4 TO 29

Example 1 is repeated using an appropriate amount of compounds 4a to 29a in Table 3 below instead of the compound of formula 1a.

TABLE 3

| Compound No. | Structure | m.p. (°C.) |
|---|---|---|
| 4a | (CH$_3$)$_2$C(CH$_2$O)$_2$P(=S)—O-i-C$_3$H$_7$ | 88–90 |
| 5a | (CH$_3$)$_2$C(CH$_2$O)$_2$P(=S)—O—C$_6$H$_{11}$ | 51–3 |
| 6a | (CH$_3$)$_2$C(CH$_2$O)$_2$P(=S)—O—C$_6$H$_4$—CH$_3$ | 72–3 |
| 7a | (cyclohexyl-spiro)C(CH$_2$O)$_2$P(=S)—O—C$_6$H$_5$ | 124–5 |
| 8a | {(CH$_3$)$_2$C(CH$_2$O)$_2$P(=S)—OCH$_2$}$_2$C(CH$_3$)$_2$ | 164–5 |
| 9a | {(CH$_3$)$_2$C(CH$_2$O)$_2$P(=S)—OCH$_2$}$_2$ | 177–9 |
| 10a | {(CH$_3$)$_2$C(CH$_2$O)$_2$P(=S)—OCH$_2$—CH=}$_2$ | 138–140 |
| 11a | (CH$_3$)$_2$C(CH$_2$O)$_2$P(=S)—O—C$_6$H$_{10}$—O—P(=S)(OCH$_2$)$_2$C(CH$_3$)$_2$ | 228–231 |
| 12a | (CH$_3$)$_2$C(CH$_2$O)$_2$P(=S)—OCH$_2$—C(CH$_3$)$_3$ | 81–82 |
| 13a | (CH$_3$)$_2$C(CH$_2$O)$_2$P(=S)—O—C$_6$H$_4$—O—P(=S)(OCH$_2$)$_2$C(CH$_3$)$_2$ | 204–6 |

TABLE 3-continued

| Compound No. | Structure | m.p. (°C.) |
|---|---|---|
| 14a | $\left\{ \begin{array}{c} CH_3 \\ CH_3 \end{array} \middle\rangle\!\!\!\left\langle\! \begin{array}{c} O \\ \parallel \\ P-OCH_2 \\ O \\ S \end{array}\!\right\}_2\!\!\!-C(CH_2Cl)_2$ | 171–3 |
| 15a | $\begin{array}{c} BrCH_2 \\ BrCH_2 \end{array}\!\!\!\left\langle\! \begin{array}{c} O \\ \parallel \\ P-OCH_3 \\ O \\ S \end{array}\right.$ | 104–6 |
| 16a | $\begin{array}{c} C_2H_5 \\ CH_3 \end{array}\!\!\!\left\langle\! \begin{array}{c} O \\ \parallel \\ P-OCH_2-C(CH_2Br)_3 \\ O \\ S \end{array}\right.$ | 127–9 |
| 17a | $\begin{array}{c} CH_3 \\ n\text{-}C_3H_7 \end{array}\!\!\!\left\langle\! \begin{array}{c} O \\ \parallel S \\ P-OCH_2-C(CH_2Br)_3 \\ O \end{array}\right.$ | liquid |
| 18a | phenyl-O-P(=S)(O-)(O-)-CH₂-C-CH₂-(O-)(O-)P(=S)-O-phenyl | 194–5 |
| 19a | $\left\{\! \begin{array}{c} CH_2O \\ CH_2 \\ \phantom{CH_2}CHO \\ \phantom{CH_2}\vert \\ \phantom{CH_2}CH_3 \end{array}\!\!\!\right\rangle\!\!\!\left\langle\! \begin{array}{c} O \\ P \\ \parallel \\ S \end{array}\!\!-O \right\}_2$ | 161–3 |
| 20a | $\left\{\! \begin{array}{c} CH-O \\ CH_2 \\ \phantom{CH_2}C-O \\ CH_3\phantom{-}CH_3 \end{array}\!\!\!\right\rangle\!\!\!\left\langle\! \begin{array}{c} O \\ P \\ \parallel \\ S \end{array}\!\!-O \right\}_2$ | 126–9 |
| 21a | $\left\{\! \begin{array}{c} CH_3 \quad CH_2O \\ C \\ sec.C_4H_9 \quad CH_2O \end{array}\!\!\!\right\rangle\!\!\!\left\langle\! \begin{array}{c} O \\ P \\ \parallel \\ S \end{array}\!\!-O \right\}_2$ | 94–8 |
| 22a | $\left\{\! \begin{array}{c} CH_3 \\ C_2H_5 \end{array}\!\!\!\right\rangle\!\!\!\left\langle\! \begin{array}{c} O \\ \parallel \\ P \\ O \quad S \end{array}\!\!-O \right\}_2$ | 134–6 |
| 23a | $\left\{\! \begin{array}{c} C_2H_5 \\ C_2H_5 \end{array}\!\!\!\right\rangle\!\!\!\left\langle\! \begin{array}{c} O \\ \parallel \\ P \\ O \quad S \end{array}\!\!-O \right\}_2$ | 139–140 |
| 24a | $\left\{\! \begin{array}{c} CH_3 \\ C_3H_7 \end{array}\!\!\!\right\rangle\!\!\!\left\langle\! \begin{array}{c} O \\ \parallel \\ P \\ O \quad S \end{array}\!\!-O \right\}_2$ | 139–140 |

TABLE 3-continued

| Compound No. | Structure | m.p. (°C.) |
|---|---|---|
| 25a | (structure with CH₃, phenyl, P(=O)(O)(OS)) ₂ | 240-242 |
| 26a | (structure with cyclohexenyl, P(=O)(O)(OS)) ₂ | 187-188 |
| 27a | (structure with CH₃, C₂H₅, i-C₃H₇, P(=O)(O)(OS)) ₂ | 157-8 |
| 28a | (structure with C₂H₅OCH₂, C₂H₅, P(=O)(O)(OS)) ₂ | 122 |
| 29a | (structure with XCH₂, XCH₂, P(=O)(O)(OS)) ₂ | where X = Cl: 199-200<br>where X = Br: 191-192 |

EXAMPLE 30

A solution is made up as follows:
1 g of calcium stearate,
1 g of octadecyl-3-(3,5-ditert.butyl-4-hydroxyphenyl)-propionate,
0.5 g of the compound of formula 1a defined in Example 1; and
0.5 g dibutyl tin maleate
are dissolved in 25 mls of acetone.

This solution is added to 1000 g of LLDPE powder (butene comonomer; MFI [190° C./2.16 kp]=1) and is mixed for 5 minutes at 400 revs. per minute. The powder is dried for 30 minutes at 50° in an oven and subsequently compounded in a Gottfert extrusiometer having a 20 mm screw (compression 1:3, diameter to length [d:1]=1:20) at 240° C. Multiple extrusions are carried out under the same conditions. The Melt Flow Index (MFI 190° C./2.16 kp) and the Yellowness Index (YI)- =are determined after 1, 5 and 10 extrusions and are used to characterize the stabilization efficiency.

COMPARATIVE EXAMPLE C

A solution is made up as follows:
1 g of calcium stearate,
1 g of octadecyl-3-(3,5-ditert.butyl-4-hydroxyphenyl)-propionate and
1 g of tetrakis-(2,4-di-t.butyl-phenyl)-4,4'-biphenylene-diphosphonite, are dissolved in 25 mls of acetone.

This solution is added to 1000 g of LLDPE powder (butene comonomer; MFI [190° C./2.16 kp]=1) and is mixed for 5 minutes at 400 revs. per minute. The powder is dried for 30 minutes at 50° C. in an oven and subsequently compounded in a Gottfert extrusiometer having a 20 mm screw (compression 1:3, diameter to length [d:1]=1:20) at 240° C. Multiple extrusions are carried out under the same conditions. The Melt Flow Index (MFI 190×C/2.16 kp) and the Yellowness Index (YI) are determined after 1, 5 and 10 extrusions and are used to characterize the stabilization efficiency.

The Results are given in the Table below.

TABLE

| | Index | | | | | |
|---|---|---|---|---|---|---|
| | MFI | | | Yellowness | | |
| Extrusion No. | 1 | 5 | 10 | 1 | 5 | 10 |
| Example 30 | 1.01 | 1.04 | .93 | −.8 | 2.9 | 6.3 |
| Comparative Example C | 1.03 | .90 | .53 | −1.3 | 7.7 | 15.8 |

What we claim is:
1. A composition, for stabilizing a polymeric material, comprising
(a) a compound of formula I

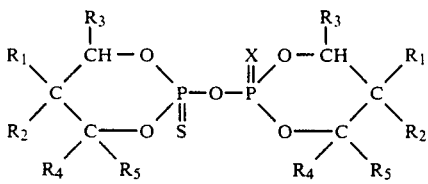

in which
- R$_1$ is hydrogen; C$_{1-4}$alkyl; —CH$_2$Br; —CH$_2$Cl; phenyl; —CO—OC$_{1-6}$alkyl or —CH$_2$—O—C$_{1-4}$alkyl;
- R$_2$ is hydrogen; C$_{1-4}$alkyl; —CH$_2$Br; —CH$_2$—Cl; —CO—OC$_{1-6}$alkyl; or
- R$_1$ and R$_2$ together with the carbon atom to which they are attached form a cyclohexyl or cyclohexenyl group;
- R$_3$ and R$_4$, independently, are hydrogen or C$_{1-4}$alkyl;
- R$_5$ is —CH$_3$ or —H and
- X is O or S and (b) an organo tin compound.

2. A stabilising composition according to claim 1 additionally containing (c) a phenolic antioxidant.

3. A stabilising composition according to claim 1, in which the compound of formula I is of formula Ia

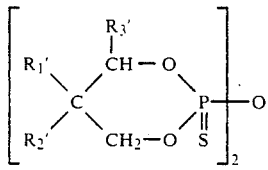

in which
- R$_1'$ is C$_{1-4}$alkyl or phenyl;
- R$_2'$ is C$_{1-4}$alkyl; and
- R$_3'$ is hydrogen or C$_{1-4}$alkyl.

4. A stabilising composition according to claim 1 comprising
(a) the compound of formula X

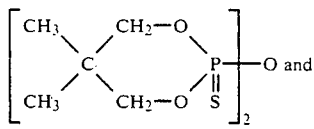

(b) di-C$_{4-8}$alkyl tin maleate.

5. A stabilizing composition according to claim 1 in which component (b) is selected from tin carboxylates and tin mercaptides.

6. A stabilising composition according to claim 5, in which component (b) is a compound of any one of formula III to VIII

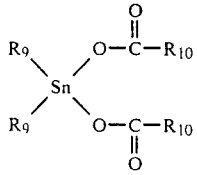

in which
R$_9$ is C$_{1-12}$alkyl; and

R$_{10}$ is C$_{1-12}$alkyl, —CH=CH—CO—OC$_{1-6}$alkyl, or both groups R$_{10}$ form a bridging group —CH=CH—;
a compound of formula IV or V

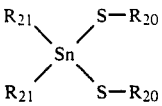

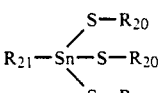

in which
R$_{21}$ is selected from C$_{1-12}$alkyl or —CH$_2$—CH$_2$—CO—O—C$_{1-12}$alkyl; and
R$_{20}$ independently, is —CH$_2$—CO—O—C$_{1-12}$alkyl, —CH$_2$CH$_2$—CO—OC$_{1-12}$alkyl, —CH$_2$—CH$_2$—O—CO—C$_{1-12}$alkyl or C$_{1-12}$alkyl;
a compound of formula VI

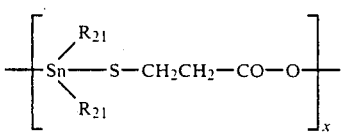

where
R$_{21}$ is as defined above and
x is an integer from 1 to 20 inclusive;
a compound of formula VII

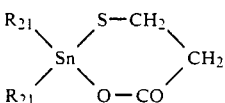

where
R$_{21}$ is as defined above;
the compound of formula VIII

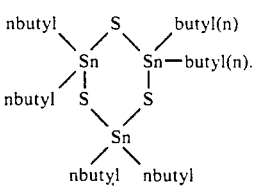

7. A stabilizing composition according to claim 6 in which component (a) is a compound of formula Ia

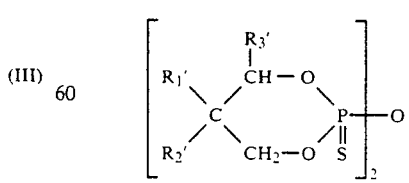

in which
- R$_1'$ is C$_{1-4}$alkyl or phenyl;
- R$_2'$ is C$_{1-4}$alkyl; and
- R$_3'$ is hydrogen or C$_{1-4}$alkyl.

8. A stabilizing composition according to claim 1 wherein the ratio of (a) to (b) is in the range 10:1 to 1:10.

9. A stabilizing composition according to claim 5 wherein the ratio of (a) to (b) is in the range 10:1 to 1:10.

10. A stabilizing composition according to claim 6 wherein the ratio of (a) to (b) is in the range 10:1 to 1:10.

11. A stabilizing composition according to claim 7 wherein the ratio of (a) to (b) is in the range 3:1 to 1:3.

12. A stabilizing composition according to claim 6 wherein component (b) is a compound of formula III.

13. A stabilizing composition according to claim 12 wherein the ratio of (a) to (b) is in the range 3:1 to 1:3.

14. A stabilizing composition according to claim 6 which further contains (c) a phenolic antioxidant.

* * * * *